(12) United States Patent
Joseph (10) Patent No.: US 7,963,112 B1
(45) Date of Patent: Jun. 21, 2011

(54) PORTABLE WAVE-SWASH AND COASTAL-WIND ENERGY HARVESTER

(76) Inventor: Erat S. Joseph, Baton Rouge, LA (US)

(*) Notice: Subject to any disclaimer, the term of this patent is extended or adjusted under 35 U.S.C. 154(b) by 0 days.

(21) Appl. No.: 12/799,164

(22) Filed: Apr. 20, 2010

Related U.S. Application Data (60) Provisional application No. 61/214,379, filed on Apr. 23, 2009.

(51) Int. Cl.
| | |
|---|---|
| F03B 17/02 | (2006.01) |
| F03B 13/18 | (2006.01) |
| F03B 13/10 | (2006.01) |
| H02P 9/04 | (2006.01) |

(52) U.S. Cl. ........ 60/499; 60/495; 60/497; 60/507; 290/42; 290/43; 290/53; 290/54

(58) Field of Classification Search ........ 60/495–507; 290/42–44, 53–55
See application file for complete search history.

(56) References Cited

U.S. PATENT DOCUMENTS

| | | | |
|---|---|---|---|
| 3,687,567 A | | 8/1972 | Lininger |
| 3,746,875 A | * | 7/1973 | Donatelli .......... 290/42 |
| 4,319,454 A | | 3/1982 | Lucia |
| 4,392,060 A | | 7/1983 | Ivy |
| 4,447,740 A | * | 5/1984 | Heck ................. 290/53 |
| 4,467,218 A | * | 8/1984 | Andruszkiw et al. ........ 290/54 |
| 4,661,716 A | * | 4/1987 | Chu .................. 290/53 |
| 4,719,754 A | | 1/1988 | Nishikawa |
| 4,818,888 A | * | 4/1989 | Lenoir, III .......... 290/43 |
| 5,005,357 A | | 4/1991 | Fox |
| 5,244,359 A | | 9/1993 | Slonim |
| 5,549,445 A | | 8/1996 | Schremp |
| 6,109,863 A | | 8/2000 | Milliken |
| 6,269,636 B1 | | 8/2001 | Hatzilakos |
| 6,559,552 B1 | | 5/2003 | Ha |
| 7,327,049 B2 | | 2/2008 | Hamburg |

* cited by examiner

*Primary Examiner* — Thomas E Denion
*Assistant Examiner* — Christopher Jetton (57) ABSTRACT

In accordance with the present invention, a portable wave-swash & coastal-wind energy harvester, once placed on a sea coast in the swash zone captures the mechanical energy contained in: (a) waves in the swash-zone, and (b) coastal-wind. Energy is extracted through: (a) wave turbines, (b) wind turbines, and (c) wave floats. A rotational transmission system with one-way clutches transmits torque to an alternator, while flywheels attached to the axles maintain steady rotation of axles. A wave funnel faces the waves and causes the wave uprush to converge toward wave turbines. A buoyancy chamber at the bottom produces reduction of weight of the portable wave-swash & coastal-wind energy harvester when water in the chamber is emptied and thereby enhances maneuverability of the unit on land and in water, while a stabilization tank at the top when filled with water provides extra weight and stability of the unit in its operating location.

18 Claims, 8 Drawing Sheets

PORTABLE WAVE-SWASH AND COASTAL-WIND ENERGY HARVESTER

RELATED APPLICATIONS

The present application is a continuation-in-part application of U.S. provisional patent application Ser. No. 61/214,379, filed Apr. 23, 2009, for PORTABLE WAVE-SWASH & COASTAL-WIND ENERGY HARVESTER, by Erat S. Joseph, included by reference herein and for which benefit of the priority date is hereby claimed.

FIELD OF THE INVENTION

The present invention relates to the simultaneous capturing of the energy contained in sea waves and in wind.

BACKGROUND OF THE INVENTION

Background

The following is a tabulation of some prior art that presently appears relevant U.S. patents

| U.S. Pat. No. | Date of Patent | Patentee |
| --- | --- | --- |
| 3,687,567 | Aug. 29, 1972 | William C. Lininger |
| 4,319,454 | Mar. 16, 1982 | Louis V. Lucia |
| 4,392,060 | Jul. 5, 1983 | Jessie T. Ivy |
| 4,719,754 | Jan. 19, 1988 | Kochi Nishikawa |
| 5,005,357 | Apr. 9, 1991 | Mansel F. Fox |
| 5,244,359 | Sep. 14, 1993 | David M. Slonim |
| 5,549,445 | Aug. 27, 1996 | Edward J. Schremp |
| 6,109,863 | Aug. 29, 2000 | Larry D. Milliken |
| 6,269,636 B1 | Aug. 7, 2001 | Constantinos Hatzilakos |
| 6,559,552 B1 | May 6, 2003 | Siu Kwong Ha |
| 7,327,049 B2 | Feb. 5, 2008 | Ron Hamburg |

Past inventions have utilized essentially the following devices to capture energy from ocean waves and wind: water wheels, wind wheels, and floats. Water wheels and wind wheels are designed to rotate, while floats are designed to move up and down on the water surface. Wave energy can be derived from the up and down motion of deep sea waves or from the flow of water that rushes up the shore after a wave breaks in the wave swash zone; this invention utilizes the energy in the wave swash.

U.S. Pat. No. 3,687,567, U.S. Pat. No. 4,719,754, U.S. Pat. No. 5,005,357, U.S. Pat. No. 5,244,359, and U.S. Pat. No. 6,109,863 do not utilize the action of wave floats, or the force of wind to extract power.

U.S. Pat. No. 4,319,454, U.S. Pat. No. 4,392,060, U.S. Pat. No. 6,269,636 B1, and U.S. Pat. No. 7,327,049 B2, utilize only floats to extract energy. They do not utilize the action of water wheel or the force of wind to generate power.

U.S. Pat. No. 6,559,552 B1, is designed to capture energy from rain, wind, wave, and solar. It utilizes a water wheel and a wind wheel, but does not utilize action of wave floats for power generation. Floats included in the design are for keeping the apparatus afloat in water, and not for producing power through the movement of floats up and down on water surface. The description states, "The turntable is rotated on bearings over a fixed-horizontal base plate, until the set-up is facing the wind and waves directly to the best advantage." One of the deficiencies of the apparatus is due to the fact that the directions of wind and wave do not necessarily match, and while the horizontal-axis wind wheel will not work unless its orientation changes to face the wind, a water wheel will not work unless it faces water flow.

U.S. Pat. No. 5,549,445 utilizes sea going platforms, wind energy conversion, and subsurface wave energy removing means. It is not designed for operation in the wave swash zone. It does not utilize the action of wave floats to generate power.

None of the above mentioned patents includes any device to assist in the retention of angular momentum for maintaining sustained rotational energy.

Among nature's energy sources, wind and sea waves are prominent. Despite the fact that abundant energy is available in wind and in sea waves, capturing of this energy economically from these sources remains a technological challenge.

One of the major drawbacks of wind mill technology lies in its very low capacity factor—the ratio of the power actually produced to the power that would have been produced if the turbines operated 100% of the time. Wind stops frequently, and consequently, standard wind mills typically have a capacity factor of only about 35%. Standard wind mills are huge in size, and are economically not feasible. One of the difficulties faced by wave turbine technology is due to the periodic nature of the occurrence of the waves and the resulting variability of torque produced by wave turbines. The present invention addresses these problems.

SUMMARY OF THE INVENTION

In accordance with the present invention, a portable wave-swash & coastal-wind energy harvester, once placed on a sea coast in the wave swash zone where water washes up on shore after an incoming wave has broken, captures the mechanical energy contained in: (a) waves in the swash zone, and (b) coastal-wind. Energy is extracted through: (a) wave turbines, (b) wind turbines, and (c) wave floats. Rotation of the wave turbines is accomplished by the force of waves. Rotation of the wind turbines is achieved by the force of wind. Reciprocating motion of the wave floats is derived from the water level variation of the uprush and backwash of the wave in the swash zone that produces up and down motion of floats. The linear movement of the wave floats is converted into rotational motion through rack and pinion gears. The torque produced by the wave turbines, the wind turbines, and the wave floats is transmitted to an alternator through a rotational transmission system that consists of flywheels, axles, large sprockets, small sprockets, roller chains, bevel gears, one-way clutches, and rack and pinion gears. Gear system with predetermined gear ratios dictates predetermined rpm for the alternator. Pairs of flywheels attached to each of the three axles connected to the wave turbines, the wind turbines, and the wave floats enable the maintenance of sustained rotation of a shaft attached to the alternator. In the front, located next to the wave turbines, facing the waves, there is a wave funnel with openings converging toward the wave turbines that receives and guides uprush from breaking waves to impinge on the wave turbines. A buoyancy chamber provided at the bottom can be emptied when needed to produce weight reduction and thus to enhance maneuverability of the portable wave-swash & coastal-wind energy harvester on land and in water. A stabilization tank at the top, when filled with water, provides added weight, stability, and resistance to overturning and sliding to the portable wave-swash & coastal-wind energy harvester in its operational location.

ADVANTAGES

The apparatus harnesses the energy of waves as well as that of wind simultaneously through the combined utilization of the wave turbines, the wind turbines, and the wave floats, complemented by the wave funnel, the flywheels, the buoyancy chamber, the stabilization tank, and other embodiments. Portability of the unit on land, its maneuverability in water, and its stability in the operational location are some of the key features. The wind turbines and the wave funnel can be assembled or disassembled at site, a feature which makes it feasible to transport the apparatus to the site in a truck.

Harnessing of energy from waves and wind simultaneously and the utilization of a combination of the wave turbines, the wind turbines, and the wave floats, complemented by the flywheels result in substantially steady rotation of the axles and a consequent increase of capacity factor to near 100%.

The wave funnel facing the wave swash receives the wave swash and guides water through converging openings, thus causing the water stream to accelerate, toward the wave turbines. Further, the openings of the wave funnel are aligned with the wave turbines in such a way that the water stream coming through the wave funnel impinges on the inner sides of the curved turbine blades on only one half on one side of the axis of each of the wave turbines.

The wind turbines are designed in such a way that they rotate in a specified direction regardless of the direction of the wind.

Pairs of flywheels attached to each of the three axles serve to maintain steady angular momentum of axles.

The required rpm for the alternator is achieved by the rotational transmission system with predetermined gear ratios.

The buoyancy chamber enhances the maneuverability of the apparatus on land and in water.

The stabilization tank serves to increase the weight, stability, and resistance to overturning and sliding of the apparatus once the apparatus is placed in its operational location in the wave swash zone.

The wind turbines, the wave funnel, and the stabilization tank are detachable, and they can be transported separately to the site and can be assembled at the site.

Multiple units placed on a shore in an energy farm can combine the energy from several units, and also can also provide a barrier to serve as a protection against coastal erosion.

The apparatus is a self-contained and portable mechanism. Designed with detachable wind turbines and the wave funnel, the base segment of the apparatus is about the size of a sports utility vehicle, and individual parts can be transported to operational site in a truck.

The buoyancy chamber at the bottom produces buoyancy when water is pumped out of it. When the apparatus has to be moved in water, the buoyancy chamber can be emptied.

Once the apparatus is placed in its operating location, it can be secured in place by pumping water into the stabilization tank located at the top. The added weight of water in the stabilization tank is utilized for preventing the apparatus from sliding or overturning.

Hydrodynamic calculations of wave energy show that the mechanism is technically feasible from the stand point of the availability of wave energy. Wave power $P=(\rho g^2 T H^2)/(32\pi)$ watts per meter of crest length, where the density of water $\rho=1025$ kg/m$^3$, the acceleration due to gravity g=9.8 m/s$^2$, T=period of wave (s), and H=height of wave (m). As an example, for a wave with height H=1 meter, period T=10 seconds, by the above equation, power P is about 10000 watts or 10 kW per meter of crest length of wave. For a unit equipped with a 3.5-meter wide wave funnel that guides the waves into the wave turbines, the power available is 35 kW. In an energy farm with several units linked together over a one-mile stretch of coastline the power available is about 15 Mega Watts.

While each unit operates independently, several units at a site can be linked together to form an energy farm that combines the energies of all units. As an added benefit, there will be reduced coastal erosion where an energy farm is located. The harnessing of the wave energy results in energy dissipation before the wave strikes the shore. Consequently, when several units are operating side by side, they act monolithically like a sea wall absorbing energy, thereby reducing littoral drift and coastal erosion. Thus, while producing energy, the energy farm can also ameliorate coastal erosion.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

REFERENCE NUMBERS AND NAMES

8 harvester invention (FIG. 7, FIG. 8, FIG. 9)
10 wave turbines (FIG. 1, FIG. 2, FIG. 3, FIG. 4, FIG. 7, FIG. 8, FIG. 9)
12 wave funnel (FIG. 1, FIG. 2, FIG. 3, FIG. 5, FIG. 6, FIG. 8, FIG. 9)
14 wave-turbine cover (FIG. 1, FIG. 2, FIG. 3)
16 wind turbines (FIG. 1, FIG. 2, FIG. 3, FIG. 4, FIG. 7, FIG. 8, FIG. 9)
18 wave floats (FIG. 2, FIG. 3, FIG. 4, FIG. 7, FIG. 8, FIG. 9)
20 float restraint (FIG. 2, FIG. 3)
22 alternator (FIG. 1, FIG. 2, FIG. 3, FIG. 4, FIG. 7, FIG. 8, FIG. 9)
24 buoyancy chamber (FIG. 2, FIG. 3, FIG. 4, FIG. 7, FIG. 8, FIG. 9)
26 stabilization tank (FIG. 2, FIG. 3, FIG. 4, FIG. 7, FIG. 8, FIG. 9)
28 rotational transmission system (FIG. 1, FIG. 3, FIG. 4, FIG. 7, FIG. 8)
30 flywheels (FIG. 1, FIG. 3, FIG. 4, FIG. 7, FIG. 8, FIG. 9)
32 axles (FIG. 1, FIG. 4, FIG. 7, FIG. 8, FIG. 9)
34 large sprockets (FIG. 1, FIG. 3, FIG. 4, FIG. 7, FIG. 8, FIG. 9)

Figure 2:
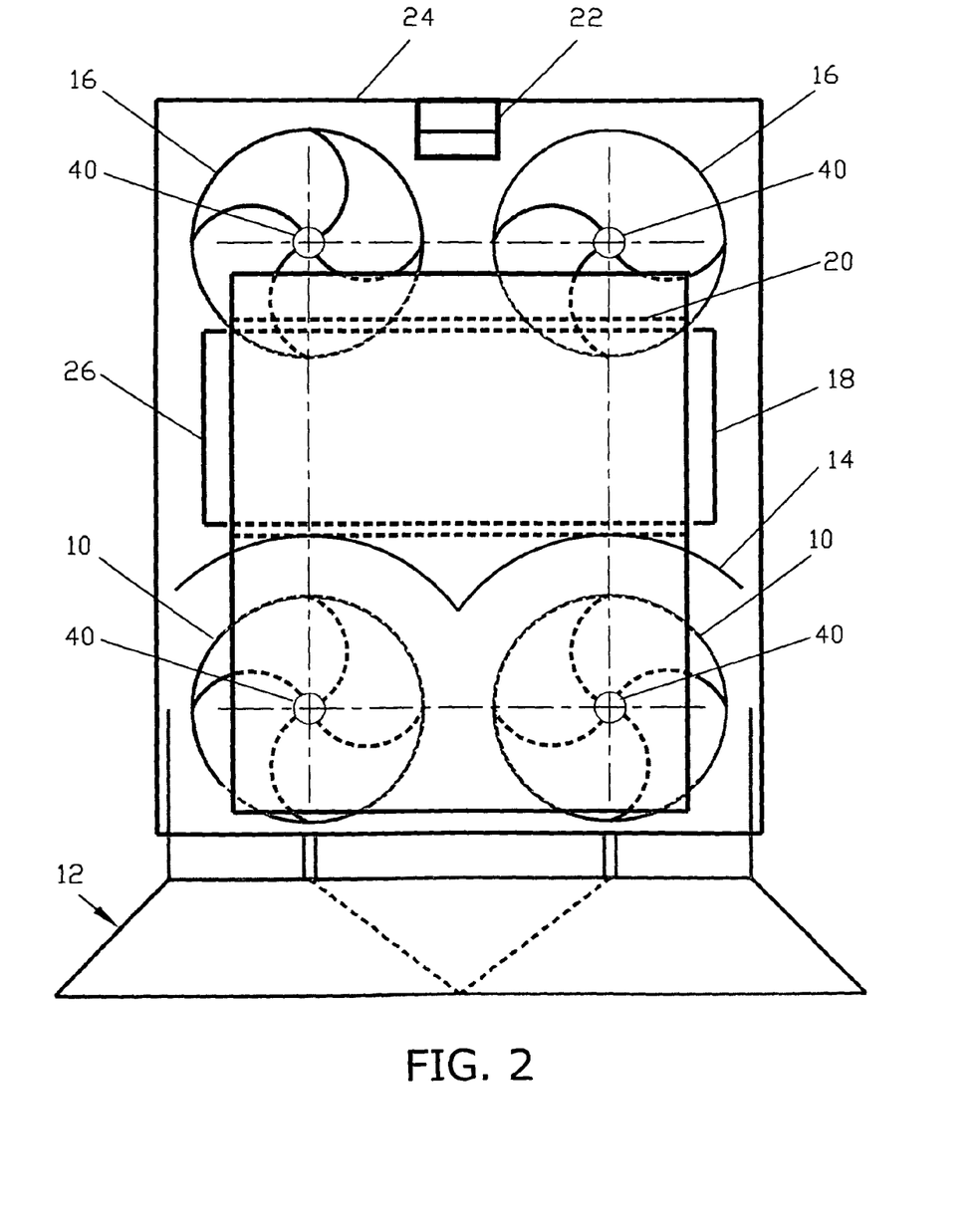
FIG. 2 is an additional top view of the portable wave-swash & coastal-wind energy harvester invention 8.
Figure 3:
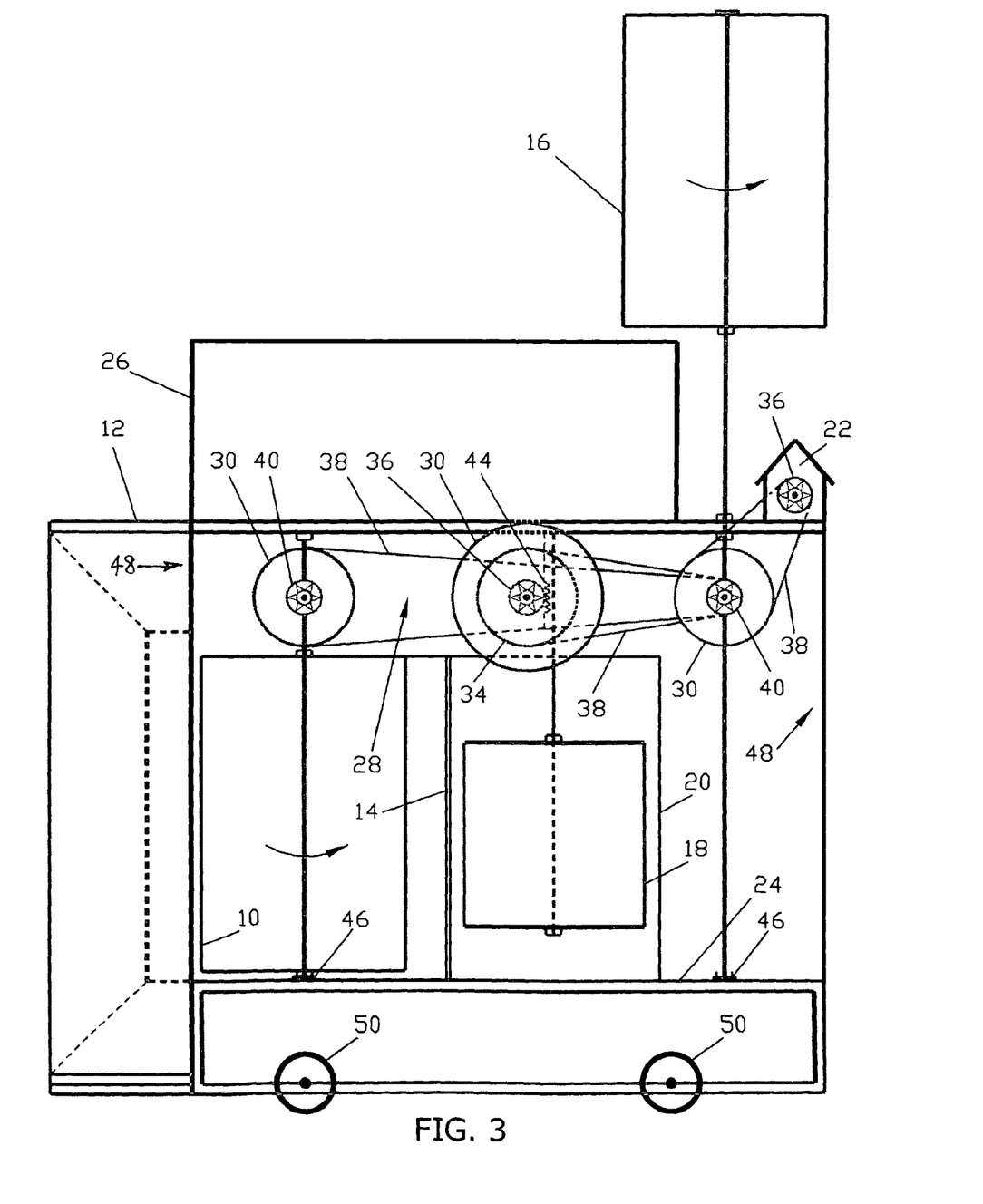
FIG. 3 is a right elevation view of the portable wave-swash & coastal-wind energy harvester invention 8.
Figure 8:
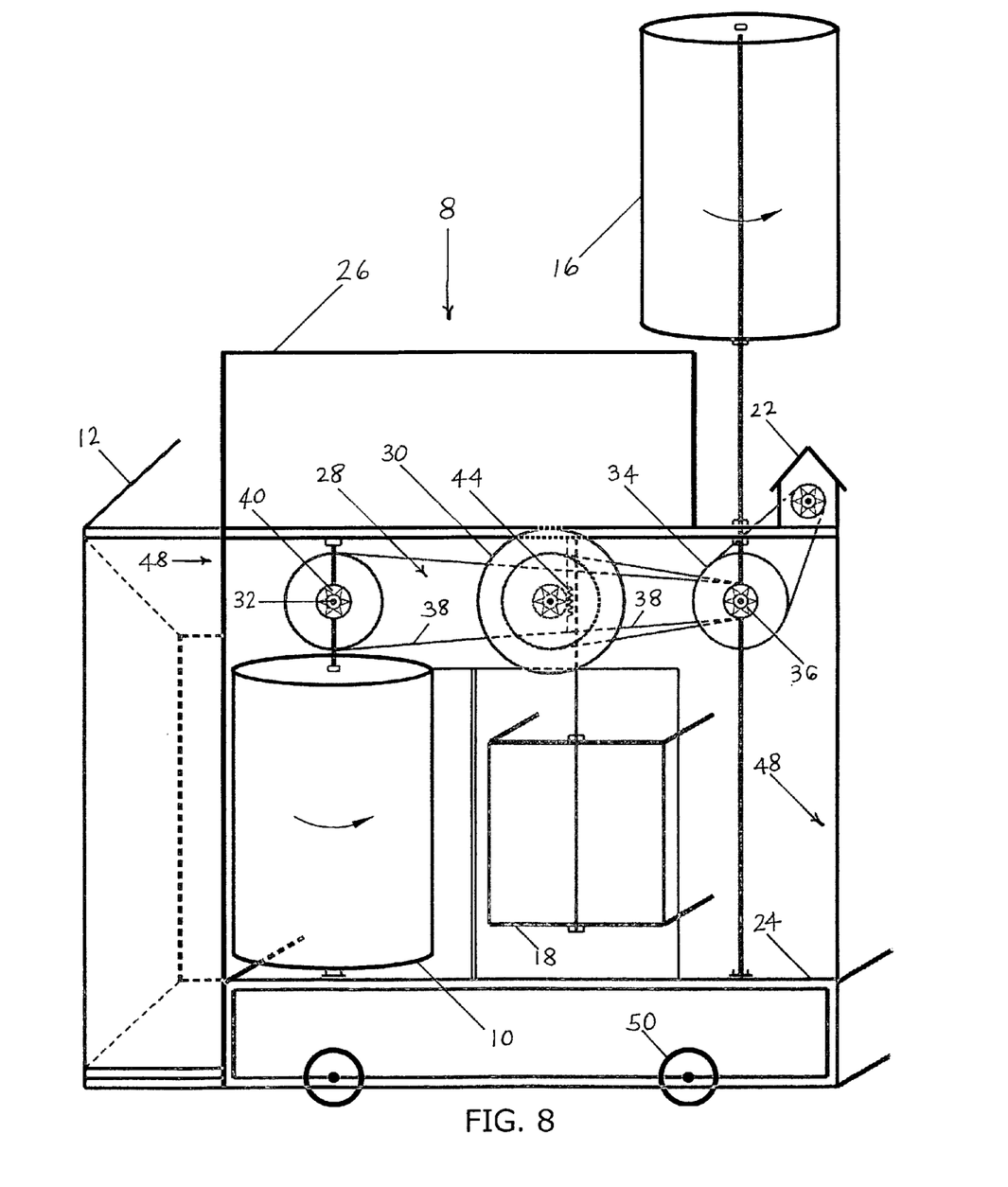
FIG. 8 is an isometric side view of the portable wave-swash & coastal-wind energy harvester invention 8.

36 small sprockets (FIG. 1, FIG. 3, FIG. 4, FIG. 8)
38 roller chains (FIG. 1, FIG. 3, FIG. 8)
40 bevel gears (FIG. 1, FIG. 2, FIG. 3, FIG. 8)
42 one-way clutches (FIG. 1)
44 rack and pinion gears (FIG. 1, FIG. 3, FIG. 4, FIG. 8)
46 bearings (FIG. 3, FIG. 4)
48 frame (FIG. 3, FIG. 8)
50 wheels (FIG. 3, FIG. 8)

DESCRIPTION OF THE PREFERRED EMBODIMENT

Figure 1:
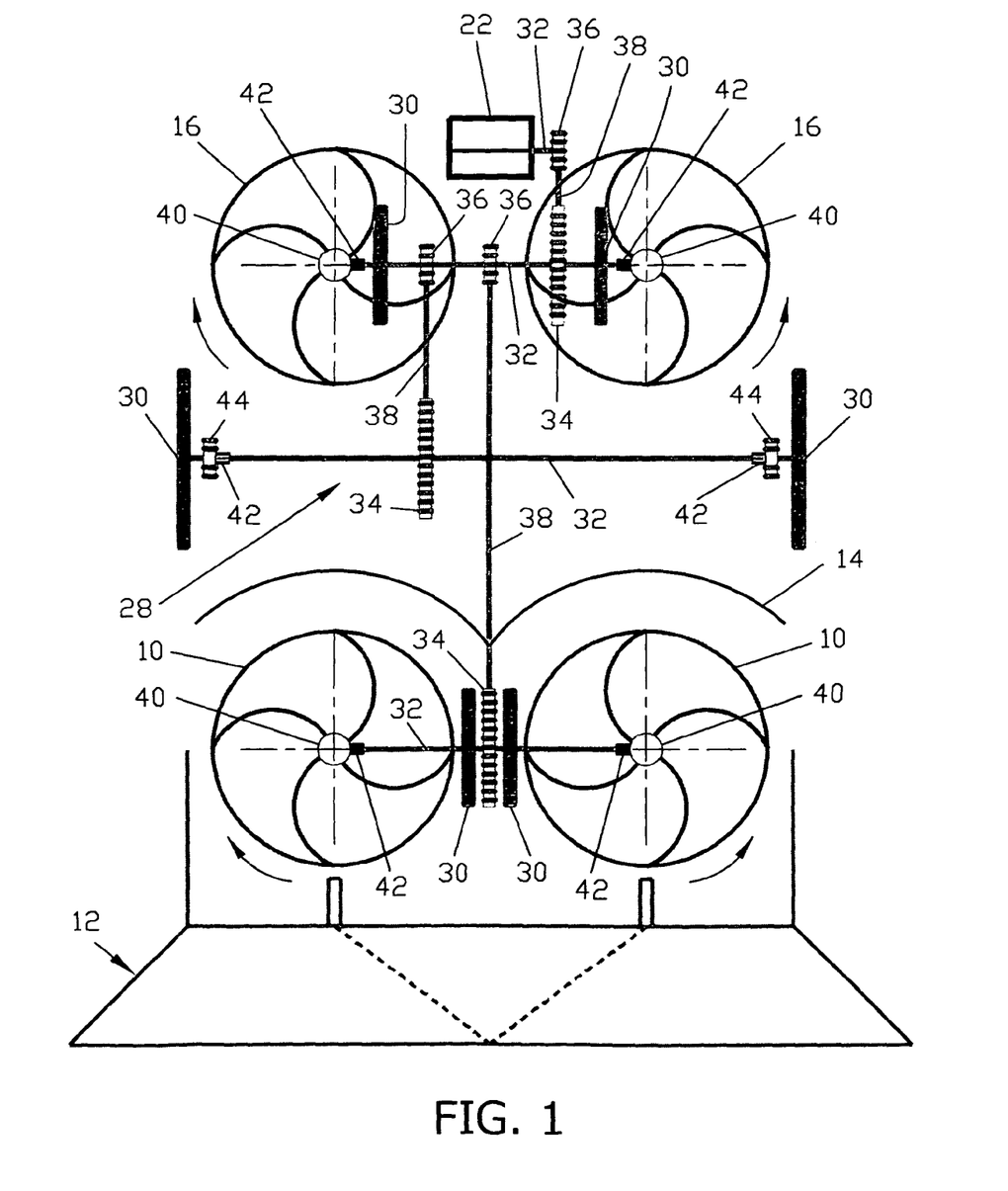
FIG. 1 is a top view of the portable wave-swash & coastal-wind energy harvester invention 8.

FIG. 1 is the top view of the portable wave-swash & coastal-wind energy harvester invention 8. Included elements: wave turbines 10, wave funnel 12, wave-turbine cover 14, wind turbines 16, alternator 22, rotational transmission system 28, flywheels 30, axles 32, large sprockets 34, small sprockets 36, roller chains 38, bevel gears 40, one-way clutches 42, and rack and pinion gears 44. Excluded for clarity from FIG. 1 are the following elements: wave floats 18, float restraint 20, buoyancy chamber 24, stabilization tank 26, bearings 46, frame 48, and wheels 50.

FIG. 2 is an additional top view of the portable wave-swash & coastal-wind energy harvester invention 8. Included elements: wave turbines 10, wave funnel 12, wave-turbine cover 14, wind turbines 16, wave floats 18, float restraint 20, alternator 22, buoyancy chamber 24, stabilization tank 26, and bevel gears 40. Excluded for clarity from FIG. 1 are the following elements: rotational transmission system 28, flywheels 30, axles 32, large sprockets 34, small sprockets 36, roller chains 38, one-way clutches 42, rack and pinion gears 44, bearings 46, frame 48, and wheels 50.

FIG. 3 is a right elevation view of the portable wave-swash & coastal-wind energy harvester invention 8.

Figure 4:
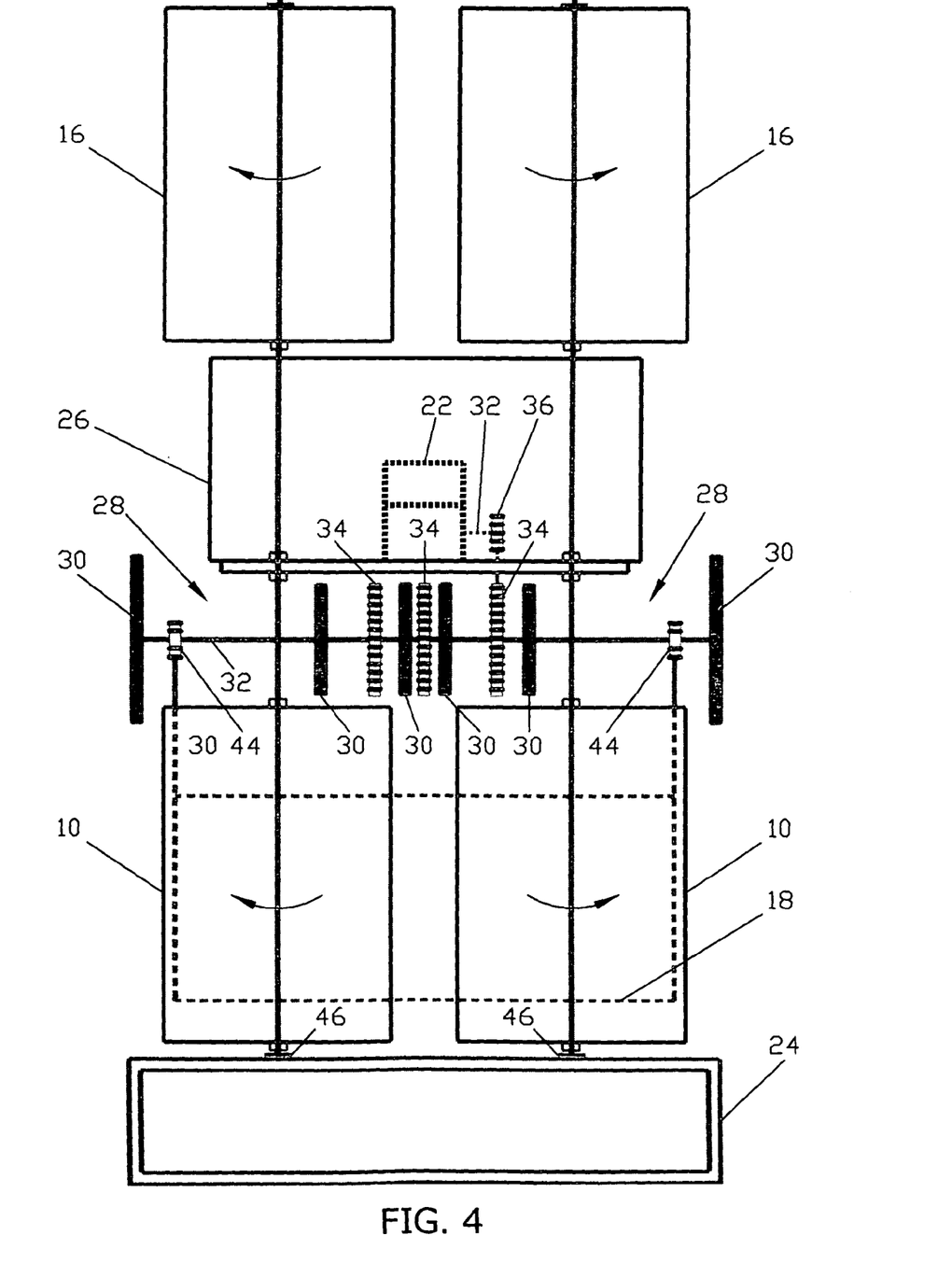
FIG. 4 is a front elevation view of the portable wave-swash & coastal-wind energy harvester invention 8.

FIG. 4 is a front elevation view of the portable wave-swash & coastal-wind energy harvester invention 8. Excluded for clarity from FIG. 4 are the following elements: wave funnel 12, wave-turbine cover 14, float restraint 20, roller chains 38, bevel gears 40, one-way clutches 42, frame 48, and wheels 50.

Figure 5:
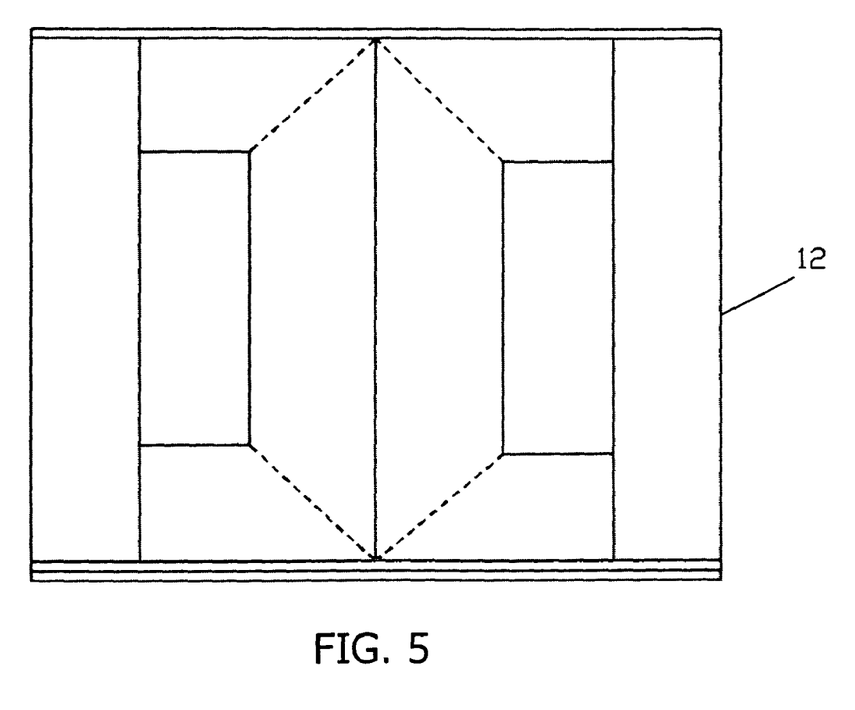
FIG. 5 is a front elevation view of the wave funnel of the portable wave-swash & coastal-wind energy harvester invention 8.

FIG. 5 is a front elevation view of the wave funnel 12 of the portable wave-swash & coastal-wind energy harvester invention 8.

Figure 6:
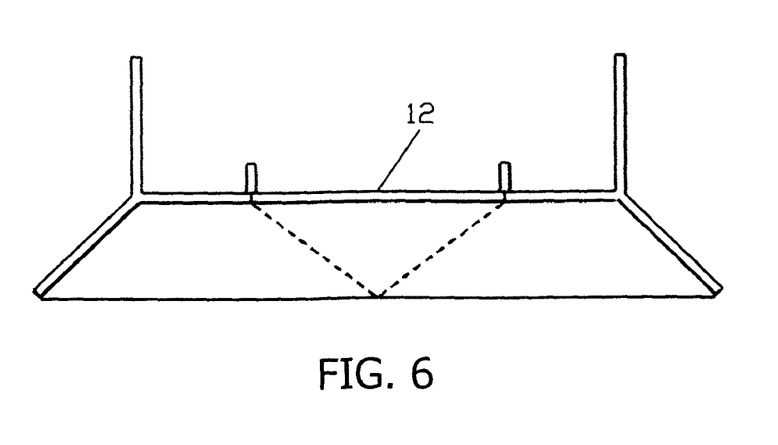
FIG. 6 is a top view of the front funnel of the portable wave-swash & coastal-wind energy harvester invention 8.

FIG. 6 is a top view of the wave funnel 12 of the portable wave-swash & coastal-wind energy harvester invention 8.

Figure 7:
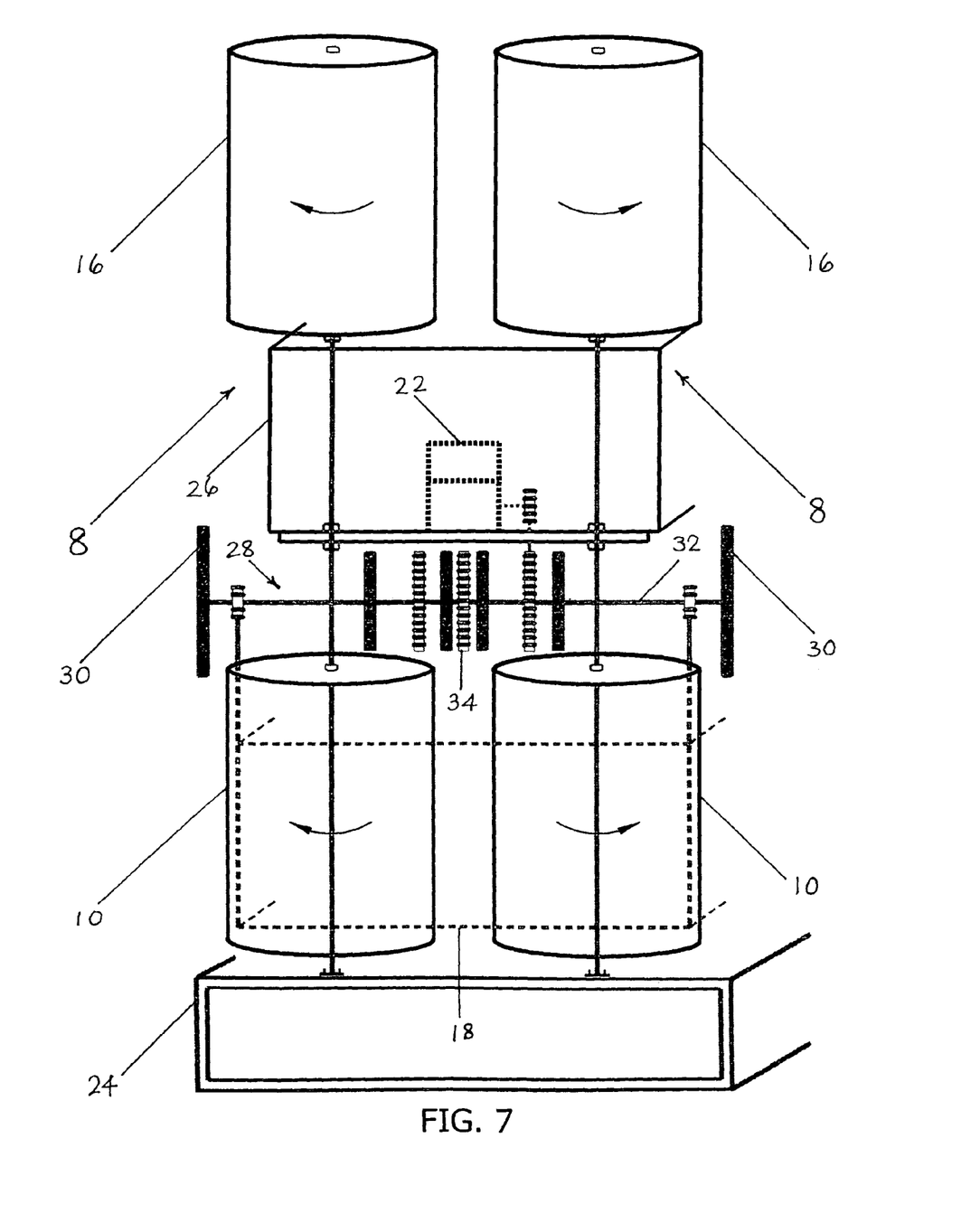
FIG. 7 is an isometric view of the portable wave-swash & coastal-wind energy harvester invention 8.

FIG. 7 is an isometric front view of the portable wave-swash & coastal-wind energy harvester invention 8 showing the following elements: wave turbines 10, wind turbines 16, wave floats 18, alternator 22, buoyancy chamber 24, stabilization tank 26, and rotational transmission system 28, flywheels 30, axles 32, and large sprockets 34.

FIG. 8 is an isometric side view the portable wave-swash & coastal-wind energy harvester invention 8 showing the following elements: wave turbines 10, wave funnel 12, wind turbines 16, wave floats 18, alternator 22, buoyancy chamber 24, stabilization tank 26, rotational transmission system 28, flywheels 30, large sprockets 34, small sprockets 36, axles 38, bevel gears 40, rack and pinion gears 44, frame 48, and wheels 50.

Figure 9:
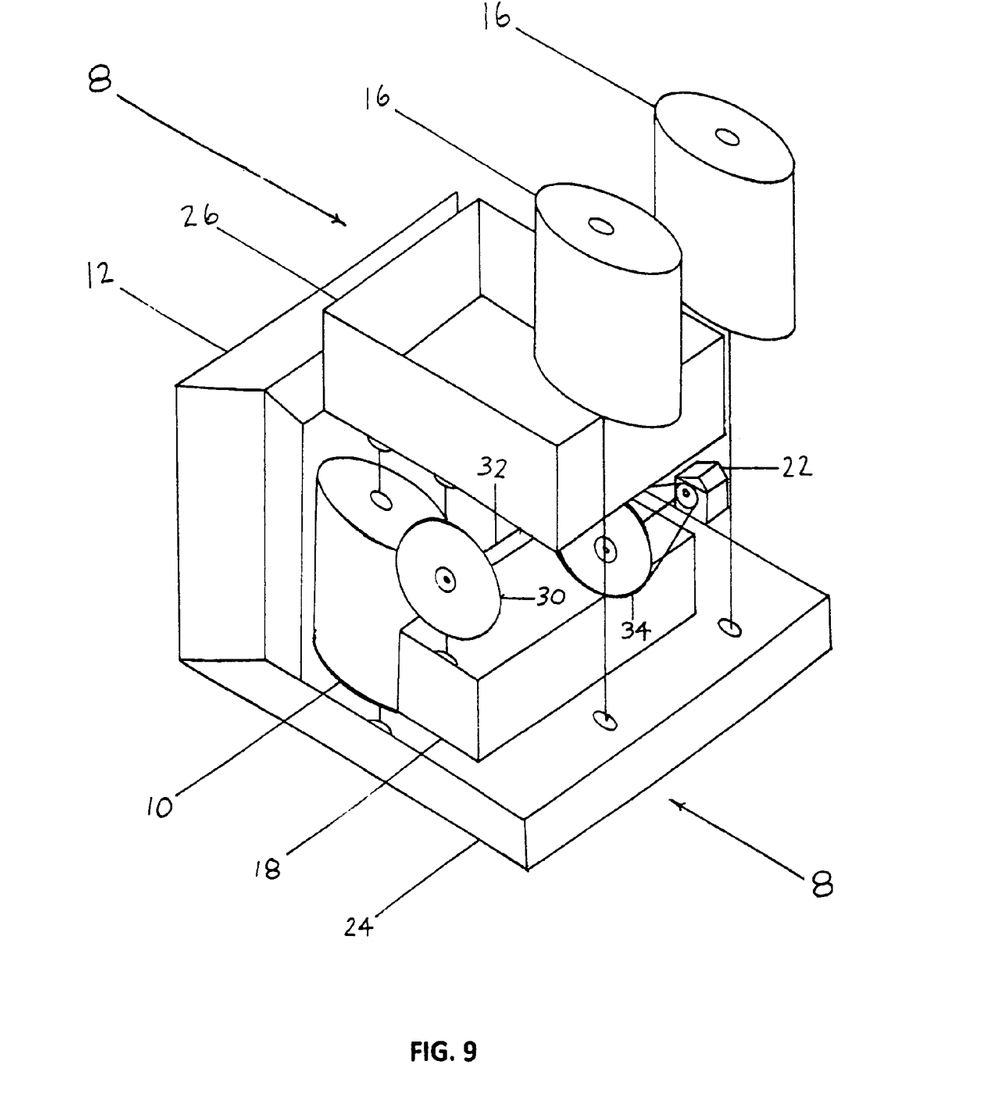
FIG. 9 is a perspective view of the portable wave-swash & coastal-wind energy harvester invention 8.

FIG. 9 is a perspective view of the portable wave-swash & coastal-wind energy harvester invention 8 showing wave turbines 10, wave funnel 12, wind turbines 16, wave float 18, alternator 22, buoyancy chamber 24, stabilization tank 26, flywheels 30, axles 32, large sprockets 34.

Wave turbines 10, rotatably mounted on frame 48, have vertical axes, and they are supported on bearings 46 which are mounted on a frame 48 of a portable wave-swash & coastal-wind energy harvester. Wave turbines 10 are located just above a buoyancy chamber 24, and are adjacent to a wave funnel 12.

Wave funnel 12, detachably united to wave turbines 10, has a converging funnel shape with opening at one end larger than the opening at the other end. It is located in front of wave turbines 10 with the large openings facing the ocean and the small openings facing wave turbines 10 in such a way that the small openings align with one half on one side of the axis of each of the wave turbines 10 while the other half on the other side of the axis of each of the wave turbines 10 is covered by part of wave funnel 12.

Wave-turbine cover 14, rigidly attached to frame 48, has segments with partial-cylindrical shapes and it wraps around the rear half of wave turbines 10, leaving predetermined space between wave-turbine cover 14 and the outer perimeter of wave turbines 10. It is located between wave turbines 10 and wave floats 18.

Wind turbines 16, rotatably mounted on frame 48, have vertical axes and they are located above stabilization tank 26.

Wave floats 18, loosely hooked to frame 48, are located just above a buoyancy chamber 24 and between wave-turbine cover 14 and vertical shafts of wind turbines 16.

Float restraint 20, mounted on frame 48, surrounds wave floats 18.

Alternator 22, mounted on frame 48, has one of the axles that has one of the small sprockets 36.

Buoyancy chamber 24, rigidly mounted on frame 48, is a hermetically sealed container located at the bottom of the portable wave-swash & coastal-wind energy harvester.

Stabilization tank 26, detachably mounted on frame 48, is a water tight container, located above the top of wave turbines 10.

Rotational transmission system 28, mounted on frame 48, comprises axles 32, flywheels 30, large sprockets 34, small sprockets 36, roller chains 38, bevel gears 40, one-way clutches 42, and rack and pinion gears 44.

Axles 32, mounted on frame 48, comprise shafts for rotating sprockets. They are connected to wave turbines 10 through bevel gears 40, to wind turbines 16 through bevel gears 40, and to wave floats 18 through rack and pinion gears 44.

Flywheels 30, rigidly mounted on axles 32, are heavy circular disks of predetermined weight and diameter.

Large sprockets 34, attached to each of the axles 32, are circular in shape and have predetermined diameters.

Small sprockets 36, attached to some of the axles 32, are circular in shape and have predetermined diameters.

Roller chains 38, attached to large sprockets 34 and to small sprockets 36, connect large sprockets 34 to small sprockets 36.

Bevel gears 40, rotatably connected to few of the axles, have conically shaped teeth. One pair of bevel gears 40 connects one of axles 32 to wave turbines 10. Another pair of bevel gears 40 connects one of axles 32 to wind turbines 16.

One-way clutches 42, attached to axles 32, are located at the end of axles 32.

Rack and pinion gears 44, movably attached to one of axles 32, comprise racks and pinions. Racks are attached to wave floats 18, and the pinions are attached to one of axles 32.

Bearings 46, attached to frame 48, support wave turbines 10, wind turbines 16, and axles 32.

Frame 48, mounted on wheels 50, is a support structure for all component parts which comprise wave turbines 10, wave funnel 12, wave-turbine cover 14, wind turbines 16, wave floats 18, alternator 22, float restraint 20, buoyancy chamber 24, stabilization tank 26, rotational transmission system 28, and bearings 46.

Wheels 50, attached to the bottom of frame 48, support frame.

In Operation,

Wave turbines 10 rotate in predetermined directions about vertical axes due to force of waves impinging on wave turbines 10. The rotational energy of wave turbines 10 is transmitted to one of the axles 32 through bevel gears 40.

Wave funnel 12 receives wave swash and causes flowing water stream to converge and accelerate toward one half on one side of the axis of each of the wave turbines 10, while part of wave funnel 12 covers the other half on the other side of the axis of each of the wave turbines 10 thereby allowing wave swash to impinge primarily on the inside of the curved turbine blades.

Wave-turbine cover 14 which envelopes the rear half of wave turbines 10 serves as a guide for water coming through wave turbines 10 to flow around wave turbines 10 through the space between the outer periphery of wave turbines 10 and the curved wave-turbine cover 14, thereby enabling wave turbines 10 to extract optimal amount of kinetic energy contained in the uprush in the wave swash zone.

Wave-turbine cover 14 serves another function by acting as a shield between wave turbines 10 and wave floats 18, thereby preventing the wave water from impacting on wave floats 18.

Wind turbines 16 rotate about vertical axes due to the force of wind blowing on wind turbines 16. By virtue of the curved shape of the blades of the wind turbines, the wind turbines rotate in predetermined directions regardless of the direction of the wind. The rotational energy of wind turbines 16 is transmitted to one of the axles 32 through bevel gears 40.

Wave floats 18 moves up and down due to the rise and fall of water surface on which wave floats 18 float. The reciprocating action of wave floats 18 is converted into rotating motion of one of axles 32 through rack and pinion gears 44.

Float restraint 20 confines the movement of wave floats 18 through a predetermined distance in the vertical direction.

Alternator 22 converts mechanical energy into electrical energy. The rotational energy generated by wave turbines 10, wind turbines 16, and wave floats 18 is transmitted to one of the axles 32 connected to alternator 22 through rotational transmission system 28.

Buoyancy chamber 24 at the bottom can hold water. By pumping water into it, the weight of a portable wave-swash & coastal-wind energy harvester can be increased, while by pumping water out of it the weight can be reduced. When the portable wave-swash & coastal-wind energy harvester has to be moved either on land or in water, to improve maneuverability, buoyancy chamber 24 can be emptied to reduce the weight of the portable wave-swash & coastal wind energy harvester. On the other hand, once the apparatus is placed in the wave swash zone for operation, it can gain more self-weight and hence more stability by filling buoyancy chamber 24 with water.

Stabilization tank 26 at the top can hold water. Once the portable wave-swash & coastal-wind energy harvester is placed in its operational location in the wave swash zone, the weight and stability of the apparatus can be increased by filling stabilization tank 26 with water.

Rotational transmission system 28 conveys torque generated by the action of wave turbines 10, wind turbines 16, and wave floats 18 to alternator 22.

Flywheels 30 rotate and carry angular momentum to sustain continuous rotation of axles 32. Flywheels 30 absorb energy and then release energy steadily. This steadily released energy is transmitted to alternator 22.

Axles 32 rotate together with flywheels 30, large sprockets 34, and small sprockets 36.

Large sprockets 34 serve to transmit torque through roller chains 38 to small sprockets 36 attached to one of axles 32.

Small sprockets 36 receive the torque from large sprockets 34 through roller chains 38.

Predetermined ratios of the diameters of large sprockets 34 to those of small sprockets 36 dictate predetermined revolutions per minute of alternator 22.

Roller chains 38 transmit the torque from large sprockets 34 to small sprockets 36, and to the alternator 22.

Bevel gears 40 connect the vertical shafts of wave turbines 10 and of wind turbines 16 to few of axles 32 thus causing a change of the direction of torque produced by the action of wave turbines 10 and wind turbines 16.

One-way clutches 42 serve to transmit torque to axles 32 in one direction while suppressing torque in the other direction. Thus, while one-way clutches 42 transmit torque toward alternator 22, it serves to disengage axles 32 and thereby to prevent axles 32 from forcing wave turbines 10 and wind turbines 16 to rotate or wave floats 18 to move.

Rack and pinion gears 44 serve to convert reciprocating vertical motion of wave floats 18 into rotatory motion of one of the axles 32.

Bearings 46 provide supports for wave turbines 10, wind turbines 16, and axles 32.

Frame 48 serves as a support structure for the apparatus.

Wheels 50 serve to facilitate rolling of the apparatus on a surface.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. While above description contains many specifications, these should not be considered as limitations on the scope, but rather as an exemplification. Many other variations are possible. For example, the direction of axes of wave turbines as well as of wind turbines shown as vertical in this example can be altered. Accordingly, the scope should be determined not by the embodiments illustrated, but by the appended claims and their legal equivalents.

Having thus described the invention, what is desired to be protected by Letters Patent is presented in the subsequently appended claims.

What is claimed is:

1. A portable wave-swash and coastal-wind energy harvester for capturing mechanical energy contained in wave-swash and coastal-wind, comprising:
   a frame;
   means, rotatably mounted on said frame, for producing rotational energy through the reaction to the force of wave-swash;
   means for receiving, guiding and converging said wave-swash;
   means, rotatably mounted on said frame, for producing rotational energy by the reaction to the force of wind;
   means, on said frame, for generating energy by producing a reciprocating motion in response to the fluctuations of water level surface of said wave-swash, said water level surface rising and falling with the uprush and backwash of said wave-swash;

means, on said frame, for converting said reciprocating motion in response to said fluctuations of said water level surface of said wave-swash into rotational motion;

means, mounted on said frame, for transmitting torque generated by the action of said rotational energy through the reaction to the force of said wave-swash, said rotational energy by the reaction to force of wind, and said rotational motion in response to said fluctuations of said water level surface of said wave-swash to an alternator;

a buoyancy chamber comprising at least one water tight bottom tank rigidly mounted on said frame;

means for pumping water out of said buoyancy chamber and thereby enhancing the maneuverability of said portable wave-swash and coastal-wind energy harvester on land and in water;

a stabilization tank comprising at least one water tight overhead tank rigidly mounted on said frame;

means for pumping water into said stabilization tank and thereby providing stability to said portable wave-swash and coastal-wind energy harvester; and means for enabling said portable wave-swash and coastal-wind energy harvester to roll along a surface, rotatably connected to said frame.

2. The portable wave-swash and coastal-wind energy harvester in accordance with claim 1, wherein said means for producing rotational energy through the reaction to the force of wave-swash comprises wave turbines.

3. The portable wave-swash and coastal-wind energy harvester in accordance with claim 2, wherein said means for receiving, guiding and converging said wave-swash toward said wave turbines comprises a wave funnel.

4. The portable wave-swash and coastal-wind energy harvester in accordance with claim 2, further comprising means for providing a semi-cylindrically shaped envelope around the rear half of each of said wave turbines to serve as a guide for water coming through said wave turbines to curve around said wave turbines thereby enabling said wave turbines to extract optimal amount of kinetic energy.

5. The portable wave-swash and coastal-wind energy harvester in accordance with claim 1, wherein said means for producing rotational energy by the reaction to the force of wind comprises wind turbines.

6. The portable wave-swash and coastal-wind energy harvester in accordance with claim 1, wherein said means for generating energy by producing reciprocating motion in response to fluctuations of water level surface of said wave-swash comprises wave floats.

7. The portable wave-swash and coastal-wind energy harvester in accordance with claim 6, further comprising means for restraining said wave floats wherein said means for restraining said wave floats confines said wave floats in such a way that said wave floats move only in the vertical direction through a predetermined distance.

8. The portable wave-swash and coastal-wind energy harvester in accordance with claim 6, wherein said means for converting said reciprocating motion in response to said fluctuations of said water level surface of said wave-swash into rotational motion comprises rack and pinion gears.

9. The portable wave-swash and coastal-wind energy harvester in accordance with claim 1, wherein said means for conveying torque generated by the action of said wave turbines, said wind turbines, and said wave floats to said alternator comprises a rotational transmission system having axles, bevel gears, one-way clutches, and flywheels.

10. The portable wave-swash and coastal-wind energy harvester in accordance with claim 9, further comprising means for dictating the rates of rotation of said axles thereby producing predetermined revolutions per minute for said alternator.

11. The portable wave-swash and coastal-wind energy harvester in accordance with claim 9, further comprising means for changing the direction of the axes of rotation from those of said wave turbines and of said wind turbines to those of said axles.

12. The portable wave-swash and coastal-wind energy harvester in accordance with claim 11, wherein said means for changing the direction of said axes of rotation from those of said wave turbines and of said wind turbines to those of said axles comprises bevel gears.

13. The portable wave-swash and coastal-wind energy harvester in accordance with claim 9, further comprising means for transmitting said torque generated in said axles in only one direction toward said alternator while suspending said torque in the other direction.

14. The portable wave-swash and coastal-wind energy harvester in accordance with claim 13, wherein said means for transmitting said torque generated in said axles in only one direction toward said alternator while suspending said torque in the other direction, comprises one-way clutches.

15. The portable wave-swash and coastal-wind energy harvester in accordance with claim 9, further comprising means for retaining angular momentum of said axles, thereby maintaining substantially steady rotation of said axles.

16. The portable wave-swash and coastal-wind energy harvester in accordance with claim 15, wherein said means for retaining said angular momentum of said axles, thereby maintaining substantially steady rotation of said axles comprises flywheels.

17. The portable wave-swash and coastal-wind energy harvester in accordance with claim 1, wherein said means for enabling said portable wave-swash and coastal-wind energy harvester to roll along a surface comprises wheels.

18. A portable wave-swash and coastal-wind energy harvester for capturing mechanical energy contained in wave-swash and coastal-wind to produce electrical energy in an alternator, and for providing protection against coastal erosion in an energy farm, comprising:

a frame;

at least one wave turbine rotatably mounted on said frame, said wave turbine producing rotation caused by the force of wave-swash that impinges on said wave turbine, said wave turbine having a front half and a rear half;

at least one wave funnel, having openings to receive and guide said wave-swash toward said wave turbines thereby enabling said wave-swash to converge and to accelerate while entering said wave turbines, said wave funnel detachably united to said wave turbines;

at least one wind turbine rotatably mounted on said frame, said wind turbine producing rotation caused by the force of wind that blows on said wind turbine;

at least one wave float loosely hooked to said frame for generating energy by producing a reciprocating motion by floating up and down on the surface of water in wave-swash zone whose level rises and falls with the uprush and backwash of said wave-swash;

a float restraint rigidly secured to said frame, for confining the movement of said wave float whereby said wave float moves only in a vertical direction through a predetermined distance;

rack and pinion gears movably attached to one of said axles for converting linear motion of said wave float into rotational motion of said axles;

at least one partial-cylindrical shaped wave-turbine cover rigidly attached to said frame for providing an envelope around said rear half of said wave turbine to create a space between said wave-turbine cover and said wave turbine to guide water exiting from said wave turbine around said wave turbine through said space between said wave-turbine cover and the outer periphery of said wave turbine thereby enabling said wave turbine to extract optimal amount of kinetic energy, and for providing a barrier between said wave turbines and said wave float;

a rotational transmission system that comprises plurality of axles, bevel gears, one-way clutches, and flywheels for conveying torque generated by the action of said wave turbines, said wind turbines, and said wave floats to said alternator;

bevel gears rotatably coupled to one of said axles for changing direction of the axes of rotation from that of said wave turbine to that of one of said axles;

bevel gears rotatably coupled to one of said axles for changing direction of the axes of rotation from that of said wind turbine to that of one of said axles;

one-way clutches rotatably coupled to said axles, for transmitting torque in said axles to said alternator in one direction only while suspending torque in the other direction;

plurality of flywheels rigidly attached to said axles for retaining angular momentum of said axles and thereby maintaining substantially steady rotation of said axles;

a buoyancy chamber at the bottom of said frame for reducing the weight by pumping water out of said buoyancy chamber and thereby enhancing maneuverability on land and in water of said portable wave-swash and coastal-wind energy harvester;

a stabilization tank detachably mounted on said frame above said wave turbines for increasing the weight by pumping water into said stabilization tank and thereby enhancing stability, and resistance to overturning and sliding, of said portable wave-swash and coastal-wind energy harvester; and wheels rotatably connected to said frame for enabling said portable wave-swash and coastal-wind energy harvester to roll along a surface.

\* \* \* \* \*